United States Patent
Henderson et al.

(10) Patent No.: US 9,961,302 B1
(45) Date of Patent: May 1, 2018

(54) VIDEO CONFERENCE ANNOTATION

(71) Applicant: Cisco Technology, Inc., San Jose, CA (US)

(72) Inventors: Andrew Henderson, Spiddal (IE); Stewart Curry, Booterstown (IE); Keith Griffin, Oranmore (IE)

(73) Assignee: Cisco Technology, Inc., San Jose, CA (US)

( * ) Notice: Subject to any disclaimer, the term of this patent is extended or adjusted under 35 U.S.C. 154(b) by 0 days. days.

(21) Appl. No.: 15/376,701

(22) Filed: Dec. 13, 2016

(51) Int. Cl.
*H04N 7/15* (2006.01)
*G06T 11/60* (2006.01)
*G06F 17/24* (2006.01)
*G06T 11/00* (2006.01)
*G06F 3/0488* (2013.01)

(52) U.S. Cl.
CPC ............. *H04N 7/15* (2013.01); *G06F 17/241* (2013.01); *G06T 11/001* (2013.01); *G06T 11/60* (2013.01); *G06F 3/04883* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,140,973 B2* | 3/2012 | Sandquist | ............. | G06F 17/241 704/270 |
| 8,914,472 B1* | 12/2014 | Lee | ............. | H04L 29/06476 709/205 |
| 9,165,281 B2 | 10/2015 | Orsolini et al. | | |
| 2009/0064245 A1* | 3/2009 | Facemire | ............ | H04N 7/17318 725/105 |
| 2009/0075633 A1* | 3/2009 | Lee | ............. | H04M 1/72583 455/412.2 |
| 2010/0241691 A1* | 9/2010 | Savitzky | ............. | G06F 15/16 709/203 |
| 2011/0117535 A1* | 5/2011 | Benko | ............. | G06F 3/04883 434/365 |
| 2012/0092436 A1* | 4/2012 | Pahud | ............. | G06Q 10/10 348/14.02 |
| 2013/0027425 A1* | 1/2013 | Yuan | ............. | G06F 3/0484 345/629 |
| 2013/0113827 A1* | 5/2013 | Forutanpour | ............. | G06T 3/4038 345/633 |

(Continued)

OTHER PUBLICATIONS

Google Hangouts—Talk to your friends and family—Hangouts lets you video call, phone, or message the people you love, 2016; available on the web at https://hangouts.google.com/.

(Continued)

*Primary Examiner* — Joseph J Nguyen
(74) *Attorney, Agent, or Firm* — Samuel M. Katz

(57) ABSTRACT

In one embodiment a method for chatting during a video conference session is implemented on a computing device and includes: displaying a shared presentation from an ongoing video conference session, detecting selection of at least one target participant from among participants of the video conference session, receiving an outgoing graphical annotation of the shared presentation via user input, and sending the outgoing graphical annotation for display as an overlay on top of the shared presentation to a video conference participant device associated with the target participant.

18 Claims, 7 Drawing Sheets

(56) References Cited

U.S. PATENT DOCUMENTS

| | | | | |
|---|---|---|---|---|
| 2013/0120522 | A1* | 5/2013 | Lian | H04N 7/15 |
| | | | | 348/14.08 |
| 2013/0129252 | A1* | 5/2013 | Lauper | G06F 17/30041 |
| | | | | 382/276 |
| 2013/0325970 | A1* | 12/2013 | Roberts | H04N 21/4788 |
| | | | | 709/206 |
| 2014/0063174 | A1* | 3/2014 | Junuzovic | G06Q 10/101 |
| | | | | 348/14.02 |
| 2015/0201162 | A1* | 7/2015 | Griffin | H04L 12/1822 |
| | | | | 348/14.07 |

OTHER PUBLICATIONS

Bryant, Matt; Periscope tests letting you draw on top of your live video streams; 2016; available on the web at http://thenextweb.com/apps/2016/04/11/periscope-tests-letting-doodle-top-live-streams/.

Hirschmann, Kenny; TWIDDLA: Smarter Than the Average Whiteboard (Apr. 17, 2014) Can be seen at: http://ccnmil.columbia.edu/enhanced/noted/twiddla_smarter_than_the_avera.html.

IBM: The IBM Lotus Sametime V8 Family Extending the IBM Unified Communications and Collaboration Strategy (2007) Can be seen at: http://www.ibm.com/developerworks/lotus/library/sametime8-new/.

MacDonald, Meillanl, Mar. 19, 2014, How to Use Hangouts Lower Third, plus Free Hangout Custom Overlay Template; available on the web at:http://mellanlmacdonald.com/?s=How+to+Use+Hangouts+Lower+Third.

Wikipedia; 2016, Smart Board; available on the web at: https://en.wikipedia.org/wiki/Smart_Board.

\* cited by examiner

VIDEO CONFERENCE ANNOTATION

FIELD OF THE INVENTION

The present invention generally relates to annotating shared displays in a video conference.

BACKGROUND OF THE INVENTION

Video conference systems and video conference participation devices are known in the art. A video conference system enables people at two or more distinct locations to interact with each other via two-way video and audio transmissions, thus simulating lifelike face-to-face interactions between people. A video conference participant device is therefore typically configured with a video camera and microphone in order to facilitate a video conference session by exchanging participant audio and video data with other video conference participant devices. In addition to participant audio and video data, some video conference systems also support the exchange of text-based chat messages between video conference participant devices. Some video conference systems also support sharing shared content with the other video conference participants; i.e., where application-based graphical images (e.g., a slideshow or video clip) from a presenting video conference device are forwarded to other video conference participant devices for display during the video conference session.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

Figure 1:
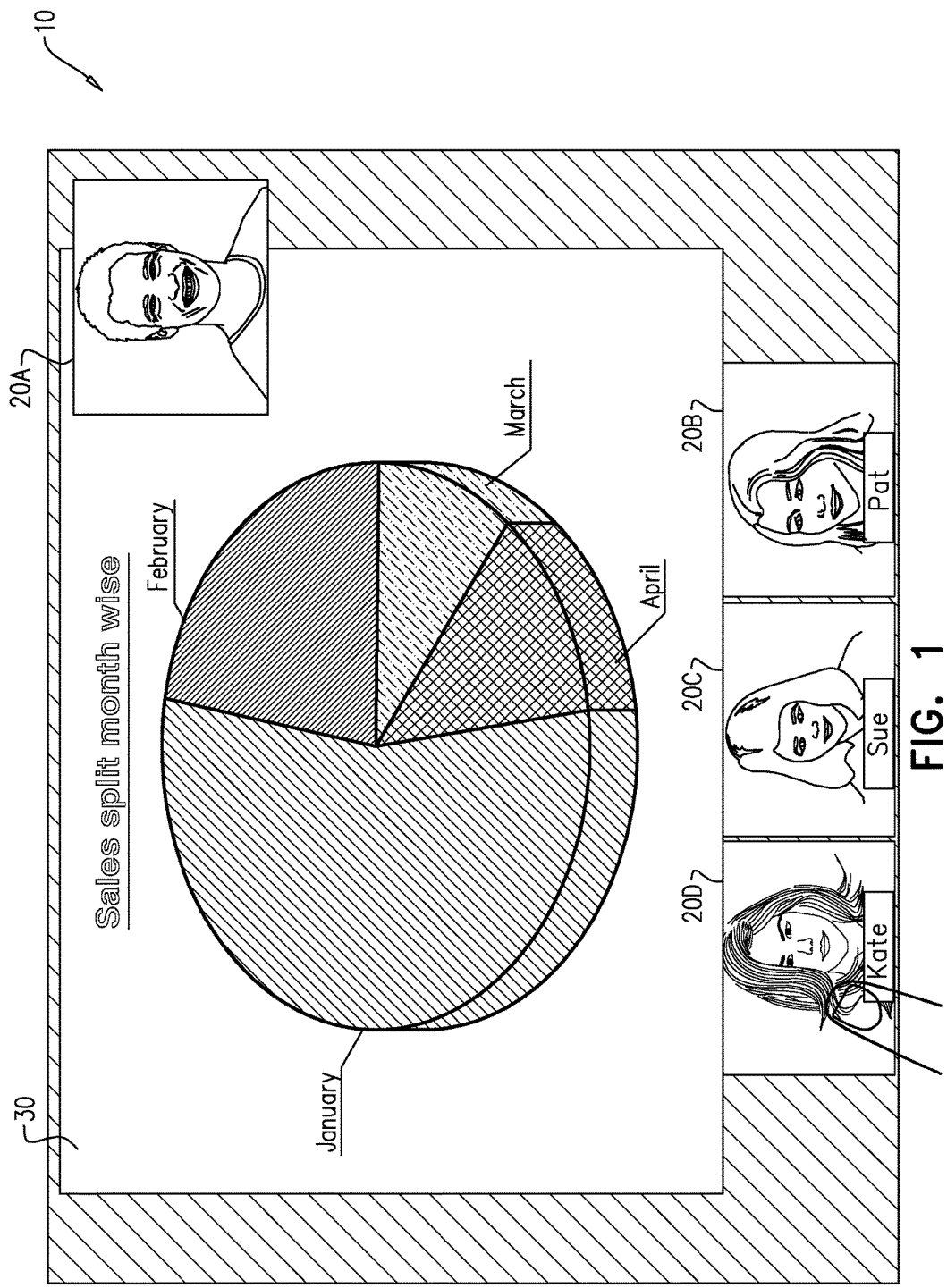
FIGS. 1-4 are simplified pictorial illustrations of displays of an exemplary video conference application, constructed and operative in accordance with embodiments described herein.

A method for chatting during a video conference session is implemented on a computing device and includes: displaying a shared presentation from an ongoing video conference session, detecting selection of at least one target participant from among participants of the video conference session, receiving an outgoing graphical annotation of the shared presentation via user input, and sending the outgoing graphical annotation for display as an overlay on top of the shared presentation to a video conference participant device associated with the target participant.

A method for chatting during a video conference session, the method implemented on a computing device and comprising: displaying a shared presentation associated with a presenting participant from an ongoing video conference session; receiving an incoming graphical annotation of said shared presentation from a video conference participant device associated with an annotating participant from among participants of said video conference session; and displaying said incoming graphical annotation as an overlay on top of said shared presentation.

Detailed Description of Example Embodiments

When a video conference participant uses a video conference participation device implemented as an application on a personal computer, typically one portion of the display screen is used to display the video of a currently speaking participant or shared content, while another portion of the display screen may be used to display a text-based chat conversation with one or more of the other participants. However, it will be appreciated that not all video conference participant devices may be capable of providing such functionality.

For example, handheld devices, such as, for example, smartphones or computer tablets, typically have smaller display screens than personal computers. Accordingly, for video conference sessions on handheld devices, most or all of the display screen may be used to display a currently speaking participant or shared content. Handheld devices also typically use keyboard overlays with touchscreen functionality for text input instead of a physical keyboard. It may therefore be problematic to continue viewing the currently speaking participant or shared content while chatting; chat functionality may only be accessible in an alternatively displayed window or via a keyboard overlay on top of the display of the currently speaking participant or shared content. If a video conference participant wishes to chat with a fellow participant about presently shared content, the chat itself may obstruct or remove the shared content from view.

In accordance with embodiments described herein, video conference participants may effectively chat with each other using graphical annotations that are entered and presented overlaid on top of the display of a currently speaking participant or shared content, thereby compensating for the constraints inherent in a relatively small display screen and/or lack of a physical keyboard.

Reference is now made to FIG. 1 which is a simplified pictorial illustration of an exemplary video conference application display 10, constructed and operative in accordance with embodiments described herein. Display 10 comprises video conference participants 20 and shared presentation 30. In FIG. 1, video conference participants 20 are depicted as still images of the participants of an ongoing video conference session. It will be appreciated, however, that the embodiments described herein may also support the depiction of video conference participants as video images and/or avatars associated with the participants or groups of participants. Shared presentation 30 is depicted in FIG. 1 as shared content provided by a presenting participant, i.e., a video conference participant that is presenting the shared content, i.e., a pie chart, to the other video conference participants. It will be appreciated that the depiction of shared presentation 30 as shared content may be exemplary. For example, in accordance with some embodiments described herein, shared presentation 30 may be video of a currently speaking participant or at least video of the video conference site at which the speaking participant is participating.

In the exemplary embodiment of FIG. 1, video conference participant 20A may be the user of the device on which display 10 is presented. Video conference participants 20B-D are some, or all, of the other video conference participants that are participating in the ongoing video conference of display 10. It will be appreciated that there may be additional video conference participants 20 that are not represented in display 10. Similarly, it will be appreciated that the embodiments described herein support the participation of fewer or more video conference participants 20 than depicted in display 10.

In the exemplary embodiment of FIG. 1, video conference participant 20A may wish to chat with Kate, i.e., video conference participant 20D. It will be appreciated that video conference participant 20A may not be the presenting participant, but rather an individual participant wishing to chat with one or more of the other video conference participants 20, but not with all of them.

Video conference participant 20A may initiate an annotation chat with Kate by selecting video conference participant 20D. Video conference participant 20A may select video conference participant 20D using any suitable user interface (UI) gesture, such as, for example, tapping, double tapping, tapping and holding, etc. on a touchscreen. It will be appreciated that the embodiments described herein are not necessarily limited to using a touchscreen for user input. In some embodiments, depending on the configuration of the device used to present display 10, a mouse or keyboard may be used to facilitate user input in addition to, or instead of, touchscreen functionality.

Figure 2:
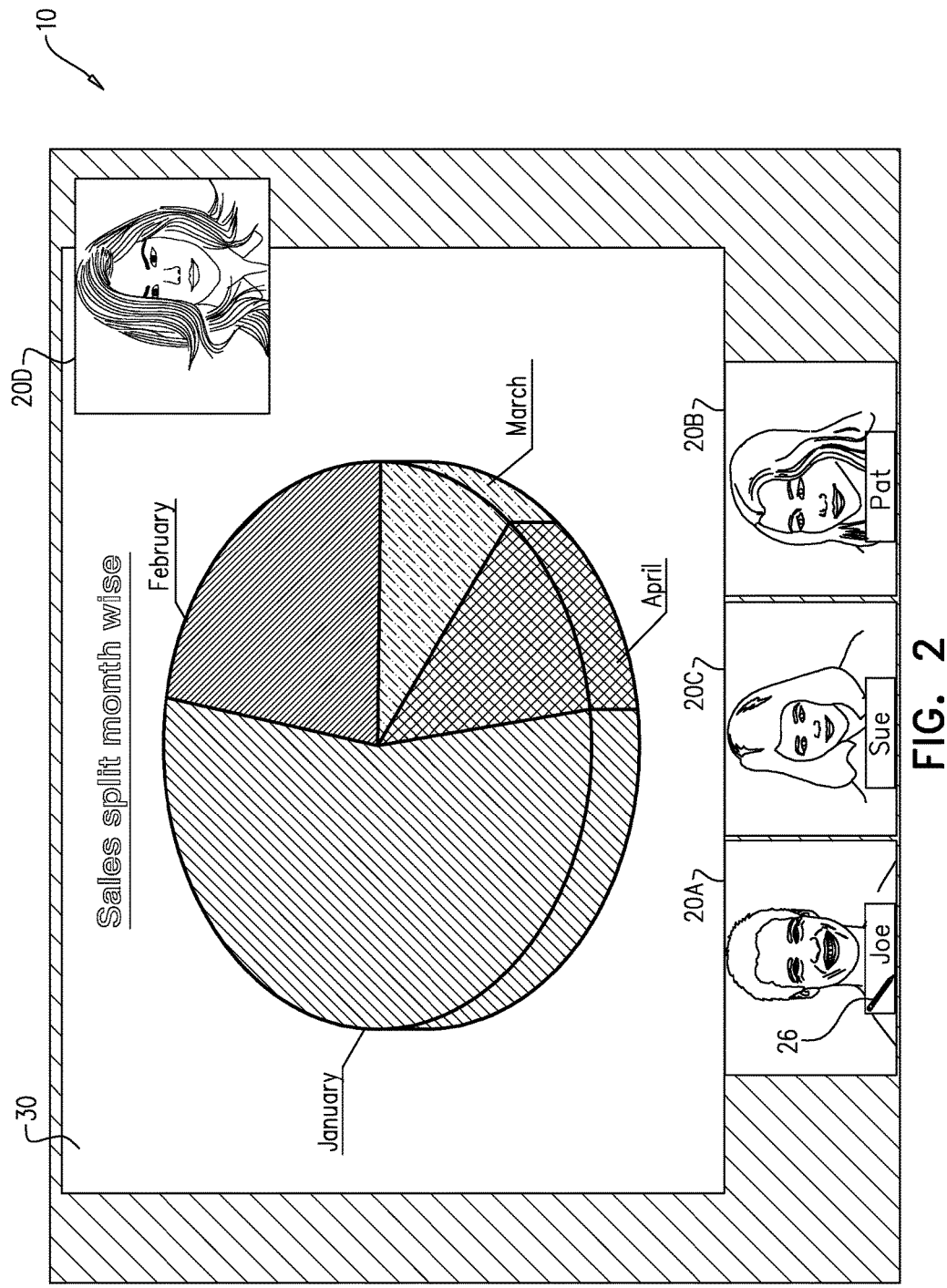

Reference is now made to FIG. 2, which is a simplified pictorial illustration of an exemplary video conference application display 10 in use by Kate, i.e., video conference participant 20D. Display 10 of FIG. 2 may be substantially similar to display 10 of FIG. 1, with the following exceptions: Video conference participant 20D may be presented in the upper right corner of display 10, thereby indicating that the associated user, i.e., Kate, is using the device on which display 10 is presented. Similarly, video conference participant 20A is displayed at the bottom of display 10, thereby indicating that the associated user, i.e., "Joe" as depicted in FIG. 2, is one of the other participants in the video conference session from the perspective of Kate.

FIG. 2 may depict display 10 as seen by Kate subsequent to the selection of Kate for a chat as depicted in FIG. 1. Accordingly, incoming annotation indicator 26 is depicted as overlaid over video conference participant 20A, thereby indicating that Joe has initiated an annotation chat with Kate. It will be appreciated that a user, e.g., Kate, may simultaneously participate in more than one annotation chat at a time. For example, Kate may simultaneously participate in an annotation chat with video conference participant 20C, i.e., "Sue". In accordance with embodiments described herein, incoming annotation indicator 26 may be colored or shaded to indicate the color or shade used by the associated annotation chat participant. For example, in the exemplary embodiment of FIG. 2, annotation indicator 26 may be blue, thereby indicating that the annotations that Joe will send to Kate will be colored blue.

Figure 3:
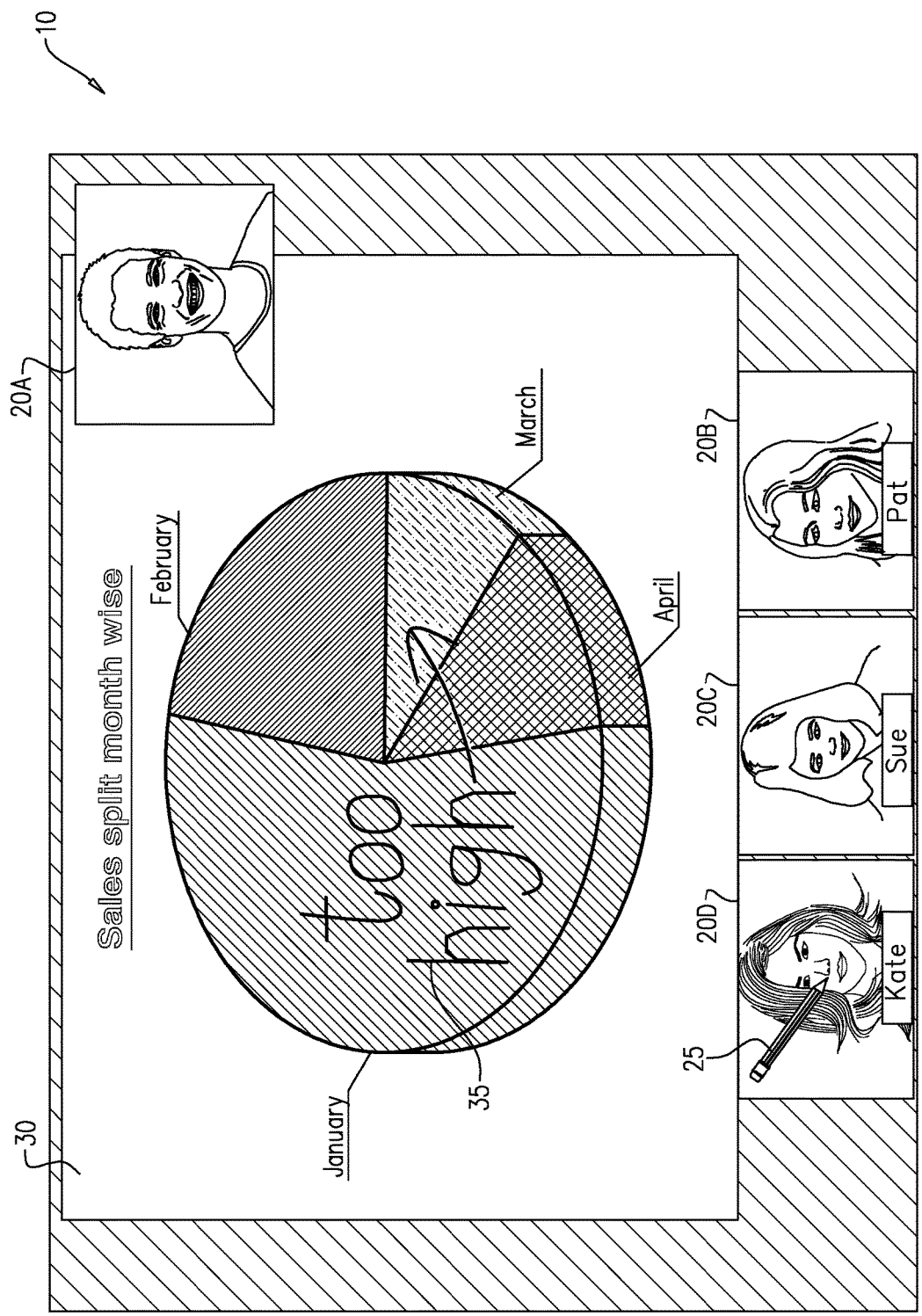

Reference is now made to FIG. 3 which is a simplified pictorial illustration of the exemplary video conference application display 10 on Joe's device, subsequent to the selection of Kate for an annotation chat. Display 10 of FIG. 3 comprises similar elements to those depicted in FIG. 1. Display 10 also comprises outgoing annotation indicator 25 and annotation 35, i.e., "too high". It will be appreciated that outgoing annotation indicator 25 may serve to indicate with which video conversation participant 20 Joe is chatting, i.e., Joe is sending annotation 35 to Kate.

Annotation 35 may be entered using any suitable UI methods. For example, Joe may draw the words "too high" with a finger or stylus on a touchscreen. In some embodiments described herein, depending on the configuration of the device used to present display 10, a mouse may be used to draw annotation 35 and/or keyboard input may be used to facilitate the input of a text-based annotation.

Figure 4:
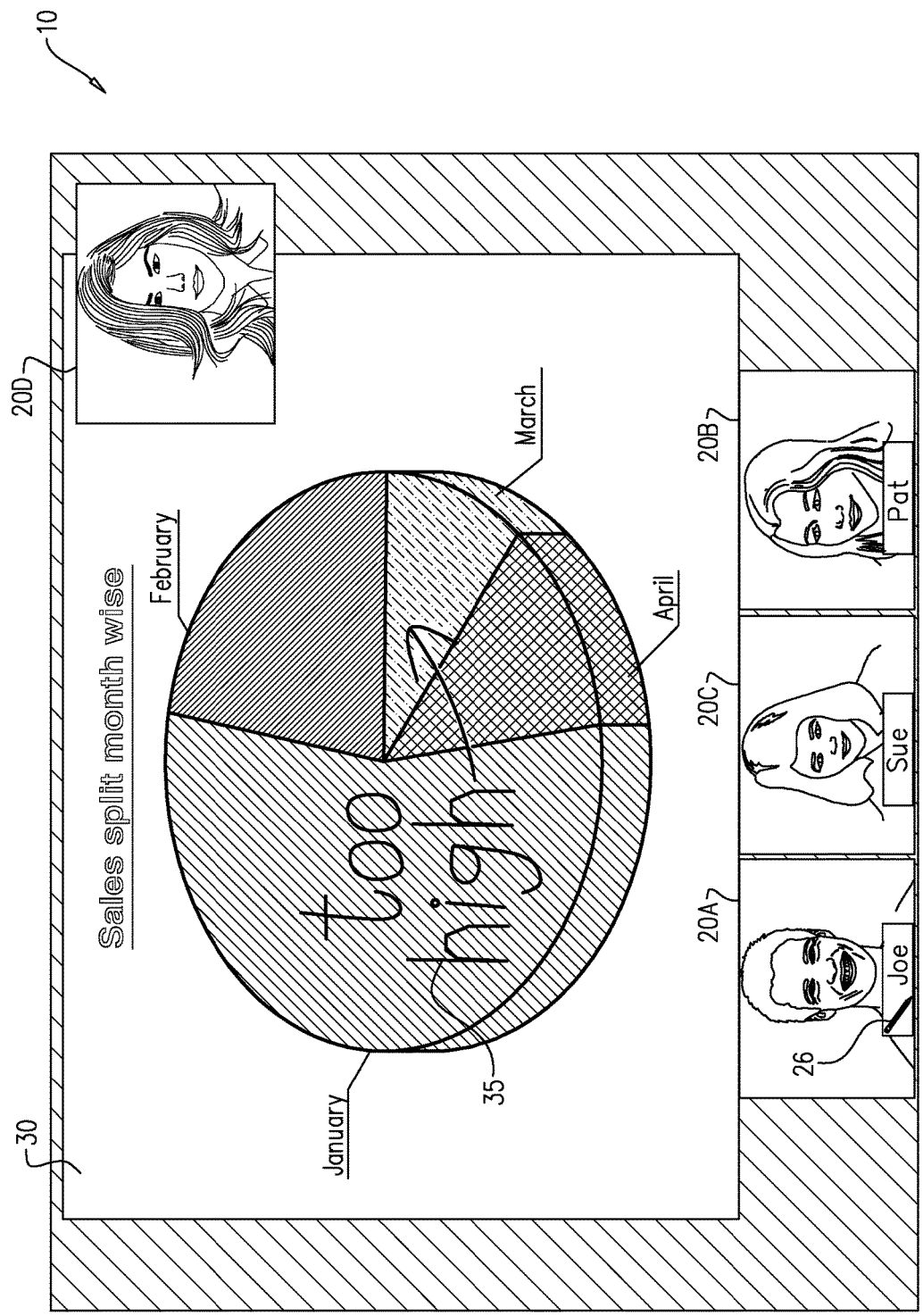

Reference is now made to FIG. 4 which is a simplified pictorial illustration of the exemplary video conference application display 10 on Kate's device, subsequent to the entry of annotation 35 in accordance with the exemplary embodiment of FIG. 3. As depicted in FIG. 4, display 10 may now comprise annotation 35 presented as an overlay over shared presentation 30.

Figure 5:
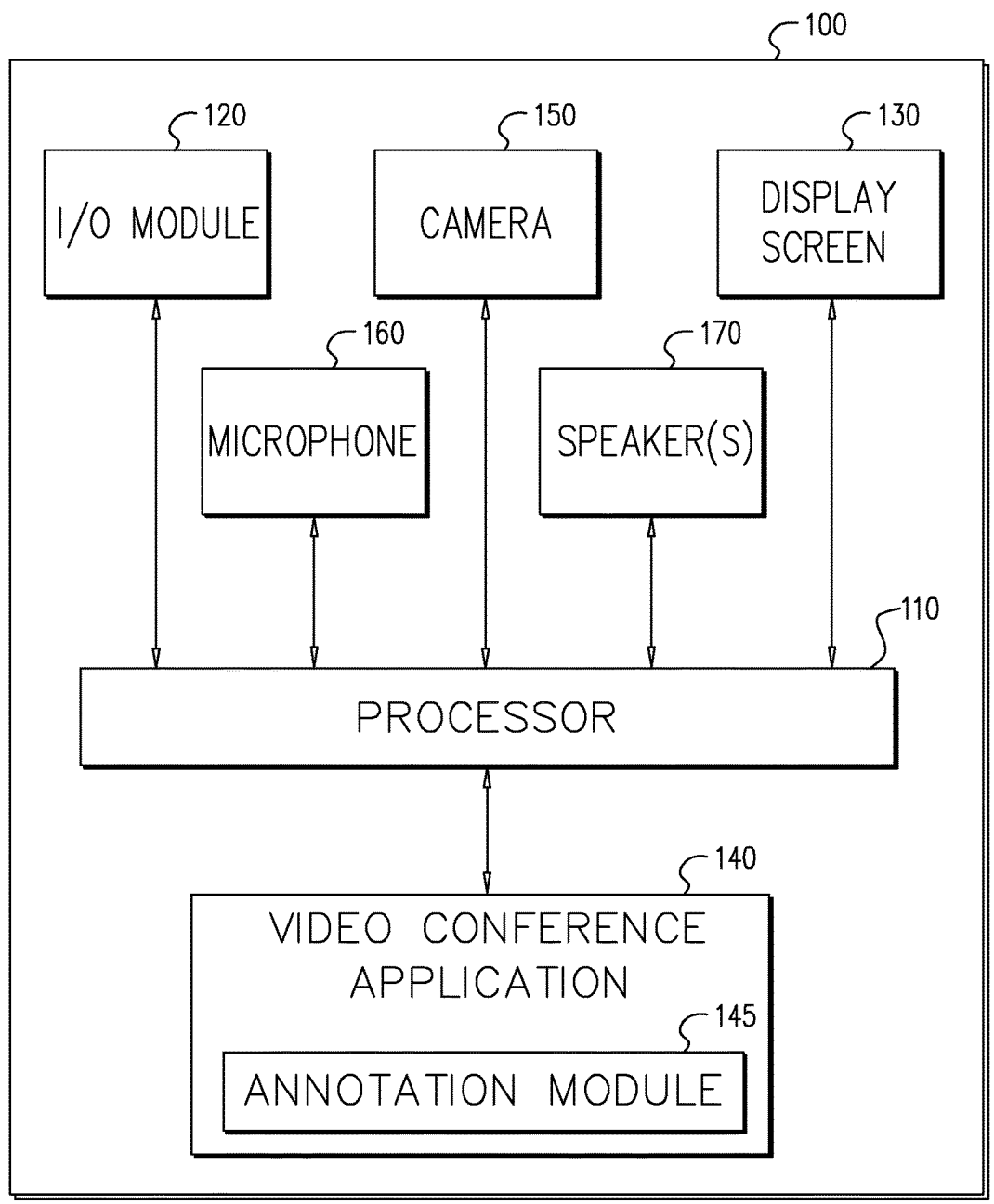
FIG. 5 is a block diagram of a computing device operative to run the exemplary collaboration application of FIGS. 1-4.

Reference is now also made to FIG. 5 which is a block diagram of a computing device 100 constructed and operative in accordance with embodiments described herein to provide an exemplary video conference application 140 configured to present displays 10 as described above with respect to FIGS. 1-4. Computing device 100 may be implemented as any suitable computing device such as, but not limited to, a personal computer, laptop computer, computer tablet, or smartphone that may be operative to provide the functionality described hereinabove with reference to FIGS. 1-4.

It will be appreciated by one of skill in the art that computing device 100 comprises hardware and software components that may provide at least the functionality of the embodiments described herein. For example, computing device 100 may comprise processor 110, I/O module 120, display screen 130, video conference application 140, camera 150, microphone 160, and speaker(s) 170.

I/O module 120 may be implemented as a transceiver or similar means suitable for transmitting and receiving data between computing device 100 and another device. Such data may be, for example, video and audio data generated by camera 150, microphone 160, and speaker(s) 170 and/or video and audio data received from another device participating in a common video conference session. Such data may also be associated with annotations 35 as described with reference to FIGS. 3-4.

In accordance with some embodiments described herein, display screen 130 may be implemented as a touchscreen to detect the direct input of UI gestures, however, as noted hereinabove, keyboard input and/or mouse clicks may also be used in addition to a touchscreen, and/or to compensate for a lack of touchscreen functionality. It will be appreciated that display screen 130 may be implemented as a built-in integrated component of computing device 100, or alternatively as an attached peripheral device.

Video conference application 140 may be any suitable application implemented in software and/or hardware that may be operative to facilitate a user's ongoing participation in a video conference session as described hereinabove. For example, video conference application 140 may be implemented as Cisco Webex®. It will, however, be appreciated that video conference application 140 may be implemented as any suitable application that supports video conference sessions between multiple participants.

It will be appreciated that computing device 100 may comprise more than one processor 110. For example, one such processor 110 may be a special purpose processor operative to execute video conference application 140. Video conference application 140 comprises annotation module 145. Annotation module 145 may be implemented in software and/or hardware and may be employed as necessary by video conference application 140 to input, modify, delete and/or present annotations for video conference sessions supported by video conference application 140.

It will be appreciated by one of ordinary skill in the art that some or all of the functionality of annotation module 145 may be implemented on a video conference server (not shown) that may be configured to facilitate video conference sessions between video conference applications 140 on different computing devices 100. For example, the collaboration server may store and/or forward annotations 35 between video conference participant devices as described hereinabove. The video conference server may also provide the input and presentation of annotations 35 as a service to participating computing devices 100.

Figure 6:
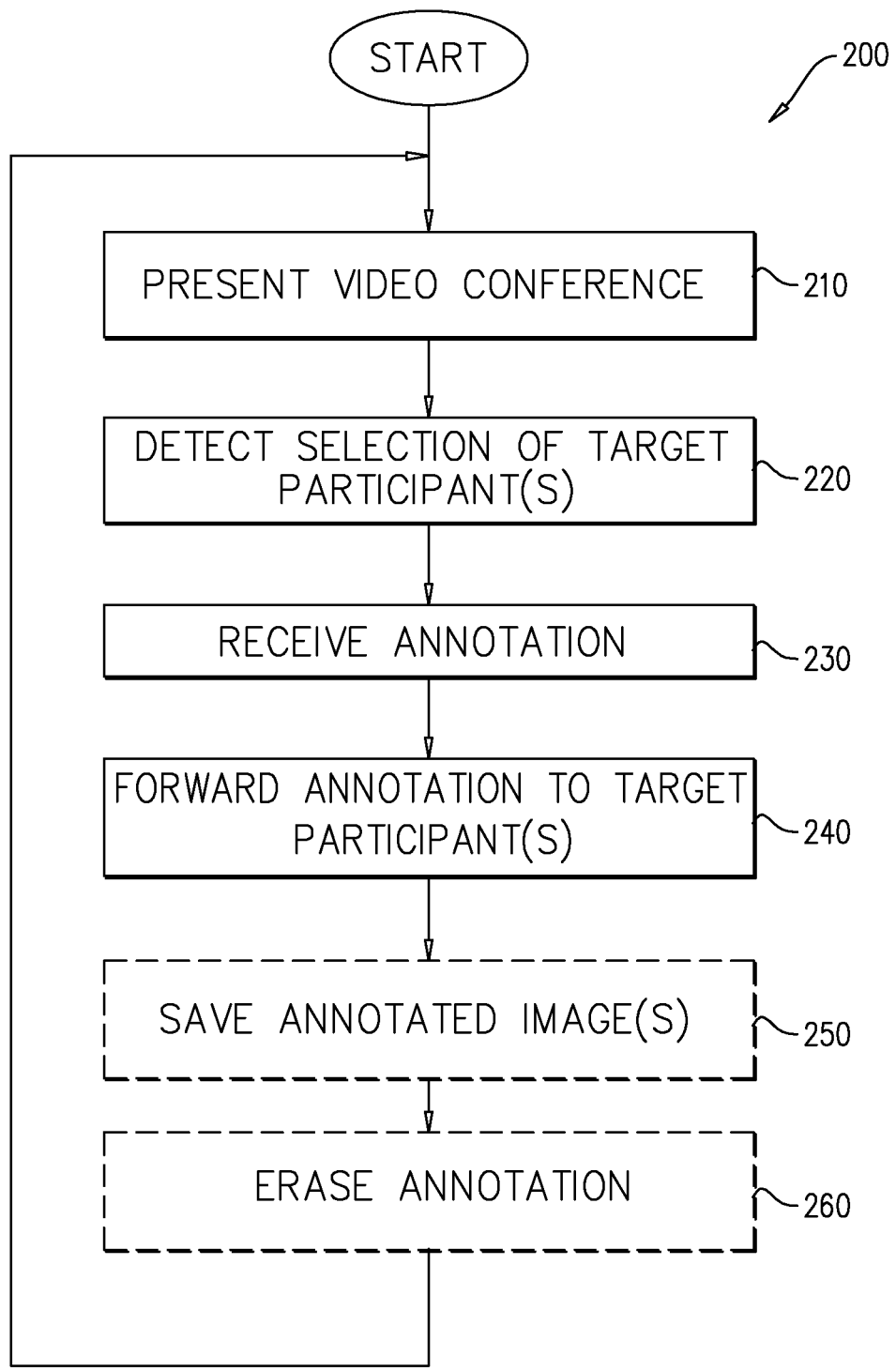
FIGS. 6 and 7 are flowcharts of exemplary annotation processes to be executed on the computing device of FIG. 5 within the context of the exemplary video conference application of FIGS. 1-4.

Reference is now also made to FIG. 6 which illustrates an exemplary annotation process 200, constructed and operative in accordance with embodiments described herein. It will be appreciated by a person of ordinary skill in the art that video conference application 140 (FIG. 5) may comprise functionality as known in the art for the support of a user's ongoing participation in a video conference session. Process 200 may be used by video conference application 140 and/or annotation module 145 to generate and/or manage annotations for an ongoing video conference session. Video conference application 140 may therefore employ annotation module 145 (FIG. 5) to execute process 200 to facilitate the input and presentation of annotations within the context of the operation of video conference application 140.

Video conference application 140 presents (step 210) a video conference session such as depicted in FIG. 1. It will be appreciated that presentation of a video conference session may entail employing camera 150 and microphone 160 to capture input from the user of computing device; exchange of audio and video data with other computing devices 100 via I/O module 120; and/or presentation of display 10 (FIG. 1) on display screen 130.

Annotation module 145 may detect (step 220) selection of a target participant, e.g. one of video conference participants 20 (FIG. 1), with which to initiate an annotation chat. Such selection may be indicated by a UI gesture, mouse click, or keyboard input as described with respect to FIG. 1. It will be appreciated that step 220 may include the selection of multiple participants. For example, annotation module 145 may be configured to interpret a tap on a video conference participant 20 as such a selection. Annotation module 145 may be further configured to interpret a swipe across two video conference participants 20 as selection of both video conference participants 20. It will be appreciated that other UI gestures and selection techniques may be employed to select one or more video conference participants 20.

It will be appreciated that as depicted in FIGS. 1 and 2, annotation module 145 may forward an indication of the selection to a device associated with the target video conference participant(s).

Subsequent to the detection of such selection, annotation module 145 may receive (step 230) an annotation 35 from the user of computing device 100 such as described above with respect to FIG. 3. Annotation module 145 may then employ I/O module 120 to forward (step 240) annotation 35 to the selected video conference participants 20, also as described above with respect to FIG. 3. It will be appreciated that the embodiments described herein may support a variety of methods and techniques for forwarding annotations 35. For example, the graphical data associated with annotations 35 may be sent in real-time or near real-time as it is input. Alternatively, the graphical data may be sent in intervals, e.g., every second, or every two seconds. Alternatively, or in addition, the user of display 10 (FIG. 3) may use a UI gesture, mouse click, or keyboard input to initiate step 240. For example, the user may tap or double tap on the target video conference participant(s) to release annotation 35 to be sent to the target devices. It will be appreciated that similar techniques may be used to clear annotation 35 from display screen 130 (FIG. 5). Alternatively, or in addition, annotation 35 may be cleared after a predefined amount of time and/or in response to a change in the underlying shared presentation 30 (FIGS. 1-4), e.g., a new slide is presented by the presenter.

Annotation module 145 may optionally save (step 250) or erase (step 260) annotation 35 in response to a user request. Alternatively, annotation module 145 may be configured to automatically save or erase annotation 35 after performing step 240. It will be appreciated that the video conference session may be recorded for viewing at a later date. A saved annotation 35 may be saved separately for future reference and/or integrated into a recording of the video conference session for viewing within the context of the original video conference session.

In accordance with some embodiments described herein, annotation module 145 may display a popup window to enable the user to request one or more actions for annotation 35. For example, the user may use a predefined UI gesture, mouse click, or keyboard input to prompt display of the popup window. The user may then select options in the popup for execution. For example, the options may include confirmation for performing steps 240, 250, and/or 260. The options may also include confirmation for ending an ongoing annotation chat. Alternatively, or in addition, an ongoing annotation chat may time out after a given period of time of inactivity.

Figure 7:
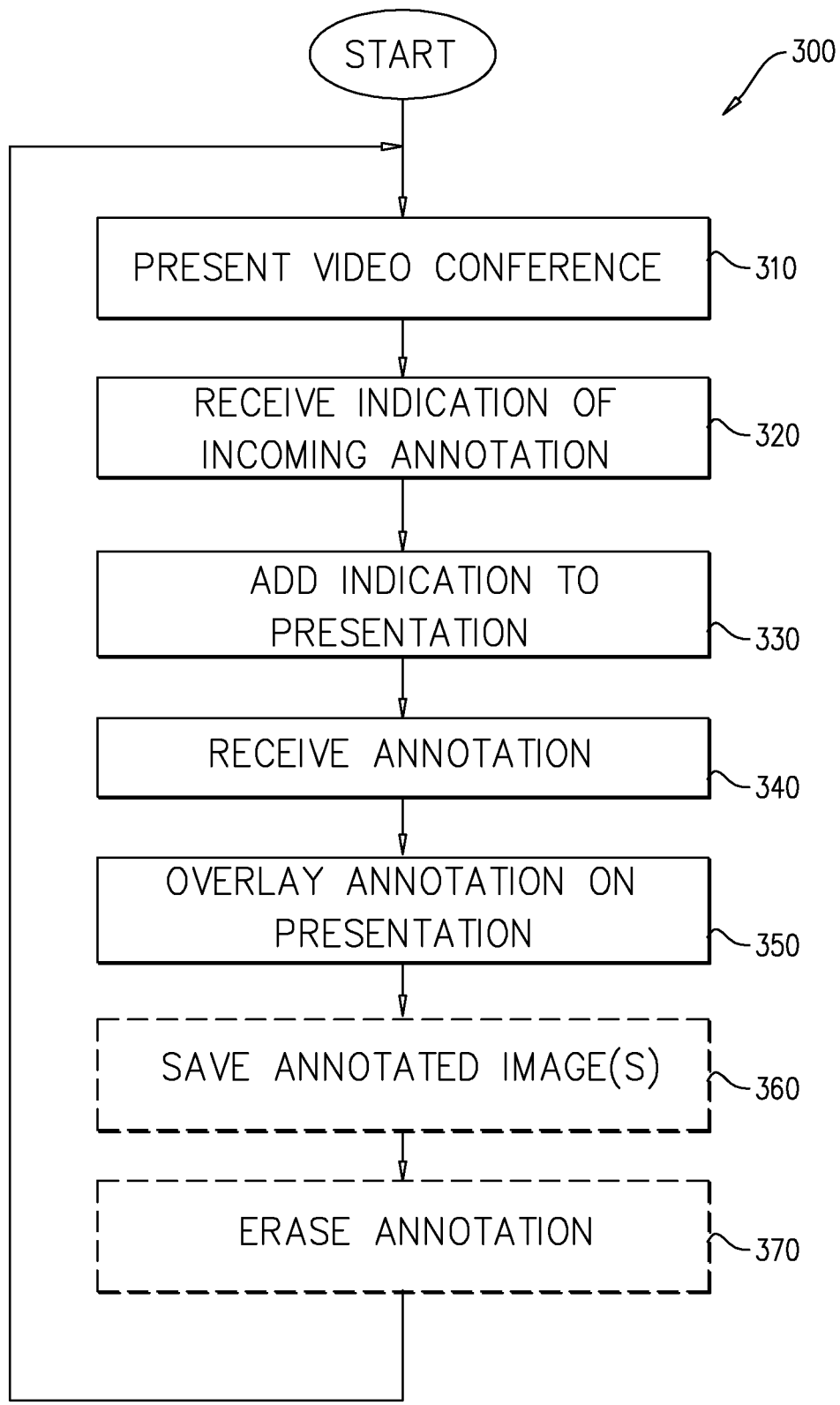

Reference is now also made to FIG. 7 which illustrates an exemplary annotation receipt process 300, constructed and operative in accordance with embodiments described herein. Process 300 may be used by video conference application 140 (FIG. 5) and/or annotation module 145 (FIG. 5) to receive and present annotations received from one or more other computing devices 100.

Video conference application 140 presents (step 310) a video conference session such as depicted in FIG. 2. It will be appreciated that presentation of a video conference session may entail employing camera 150 and microphone 160 to capture input from the user of computing device; exchange of audio and video data with other computing devices 100 via I/O module 120; and/or presentation of display 10 (FIG. 2) on display screen 130.

Annotation module 145 may receive (step 320) via I/O module 120 an indication of an incoming annotation, and add (step 330) the indication to the presentation of the video conference session. For example, annotation module 145 may overlay incoming annotation indicator 26, an image of a pencil, on the associated video conference participant 20, as shown in FIG. 2. In accordance with embodiments described herein, the indication, i.e., the pencil in FIG. 2, may be colored to indicate the color of the associated annotation 35 to be received. It will be appreciated that a given video conference participant 20 may receive annotations 35 from more than one other video conference participant 20. In such manner, the color of incoming annotation indicator 26 may be used as an indication of authorship for a given annotation 35.

In accordance with some embodiments described herein, annotation module may present a popup confirmation window to enable the receiving user to confirm receipt or alternatively reject receipt of the incoming annotation 35.

Video conference application 140 receives (step 340) annotation 35 and overlays (step 350) the received annotation 35 on the presentation of the ongoing video conference session. Annotation module 145 may optionally save (step 360) or erase (step 370) annotation 35 in response to a user request. Alternatively, annotation module 145 may be configured to automatically save or erase annotation 35 after performing step 240.

In accordance with some embodiments described herein, annotation module 145 may display a popup window to enable the user to request one or more actions for annotation 35. For example, the user may use a predefined UI gesture, mouse click, or keyboard input to prompt display of the popup window. The user may then select options in the popup for execution. For example, the options may include confirmation for performing steps 350, 360, and/or 370. The options may also include confirmation for ending an ongoing annotation chat.

It will be appreciated that both process 200 and process 300 may be performed on the same computing device 100. For example, if video conference participant 20A uses process 200 to forward annotation 35 to be presented by process 300 on a device associated with video conference participant 20D as described hereinabove, video conference participant 20D may in turn use process 200 to send an annotation 35 in reply to video conference participant 20A.

It will also be appreciated that the embodiments described herein enable a user of a handheld device to take advantage of built-in touchscreen functionality to participate in chat sessions while still benefiting from a full immersive experience of full screen video during a video conference. An added benefit may be that that the video conference session is kept in focus and in context, such that other participants may not view the chatting participant as distracted or otherwise occupied. Furthermore, shared content in the video conference display is not occluded by chat functionality that obscures view of the shared content—the video stream may be fully visible at all times. Chat annotations may be quick, temporary and not distracting, thereby allowing communication between video conference participants without interrupting the video conference itself.

It will similarly be appreciated that although the description of the embodiments described herein primarily focused on usage for handheld devices with touchscreen functionality, display 10 and processes 200 and 300 may be adapted for implementation on any suitable computing device configured to support a video conference session.

In accordance with embodiments described here, computing device 100 may be implemented as a stand-alone video enabled whiteboard that may be wall mounted or mounted on a stand. As described hereinabove, display screen 130 of computing device 100 may be a touchscreen; a stand-alone video enabled whiteboard may therefore enable a presenter to share free-hand annotations in addition to, or instead of, shared presentation 30, with other participants of a video conference session. Non-presenting participants may also use a stand-alone video enabled whiteboard to perform processes 200 and/or 300 in generally the same manner as described hereinabove.

In accordance with embodiments described herein, the operating system of the stand-alone video enabled whiteboard may be compatible with that of a computer tablet. For example, the operating system of the stand-alone video enabled whiteboard may be a version of Android® or iOS®.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for chatting during a video conference session, the method implemented on a computing device and comprising:
   receiving a shared presentation from a sharing participant, wherein said sharing participant is designated as a current presenter in an ongoing video conference session, and said computing device is not associated with said sharing participant;
   displaying said shared presentation during said ongoing video conference session;
   detecting selection of at least one target participant from among at least two other participants of said video conference session, wherein said at least one target participant is not said current presenter;
   receiving an outgoing graphical annotation of said shared presentation via user input; and
   sending said outgoing graphical annotation for display as an overlay on top of said shared presentation to at least one video conference participant device associated with only said at least one target participant.

2. The method according to claim 1 and wherein:
   said receiving comprises receiving said graphical annotation via a touchscreen interface.

3. The method according to claim 1 and wherein:
   said receiving comprises receiving said graphical annotation via mouse input.

4. The method according to claim 1 and further comprising:
   receiving an incoming graphical annotation from at least one annotating participant from among said participants of said video conference session; and
   displaying said incoming graphical annotation as an overlay on top of said shared presentation.

5. The method according to claim 4 and wherein said at least one annotating participant is said at least one target participant.

6. The method according to claim 1 and wherein said computing device is a handheld device.

7. The method according to claim 1 and further comprising:
   saving said graphical annotation.

8. The method according to claim 7 and further comprising:
   playing a recording of said video conference session; and
   displaying said saved graphical annotation as part of said playing.

9. A method for chatting during a video conference session, the method implemented on a computing device and comprising:
   displaying a shared presentation associated with a presenting participant from an ongoing video conference session, wherein said computing device is not associated with said presenting participant;

receiving an incoming graphical annotation of said shared presentation from a video conference participant device associated with an annotating participant from among participants of said video conference session, wherein said annotating participant is not said presenting participant; and displaying said incoming graphical annotation as an overlay on top of said shared presentation.

10. The method according to claim 9 and further comprising:

displaying an annotating indication of said annotating participant.

11. The method according to claim 9 and wherein:

said displaying said incoming graphical annotation comprises displaying said incoming graphical annotation in one color; and said displaying an annotating indication comprises displaying said annotating indication in association with said one color.

12. The method according to claim 11 and further comprising:

receiving an additional graphical annotation of said shared presentation from a video conference participant device associated with another participant from among said participants of said video conference session, wherein said another participant is not said presenting participant;

displaying said additional graphical annotation in a second color as another overlay on top of said incoming graphical annotation; and displaying another indication of said another participant, wherein said another indication is displayed in association with said second color.

13. The method according to claim 9 and further comprising:

detecting selection of at least one target participant from among said participants of said video conference session, wherein said at least one target participant is not said presenting participant;

receiving an outgoing graphical annotation of said shared presentation via user input; and sending said outgoing graphical annotation for display as an overlay on top of said shared presentation to a target video conference participant device associated with said target participant.

14. The method according to claim 13 and wherein:

said receiving an outgoing graphical annotation comprises receiving said graphical annotation via a touchscreen interface.

15. The method according to claim 9 and wherein:

said receiving an outgoing graphical annotation comprises receiving said graphical annotation via mouse input.

16. A video conference participation device comprising:

a display screen;

an I/O module;

a processor; and a video conference application to be executed by said processor and operative to:

display a shared presentation from a presenting participant in an ongoing video conference session on said display screen wherein said display screen is not associated with said presenting participant, detect selection of at least one target participant from among at least two other participants of said video conference session, wherein said at least one target participant is not said presenting participant, receive an outgoing graphical annotation of said shared presentation via user input, forward via said I/O module said outgoing graphical annotation for display as an overlay on top of said shared presentation to a video conference participant device associated with said target participant, receive an incoming graphical annotation of said shared presentation from a video conference participant device associated with an annotating participant from among said participants of said video conference session, wherein said annotating participant is not said presenting participant, and display said incoming graphical annotation on said display screen as an overlay on top of said shared presentation.

17. The method according to claim 16 and wherein said display screen has a touchscreen interface.

18. The method according to claim 16 and wherein said computing device is a stand-alone video whiteboard.

* * * * *